Patented July 31, 1928.

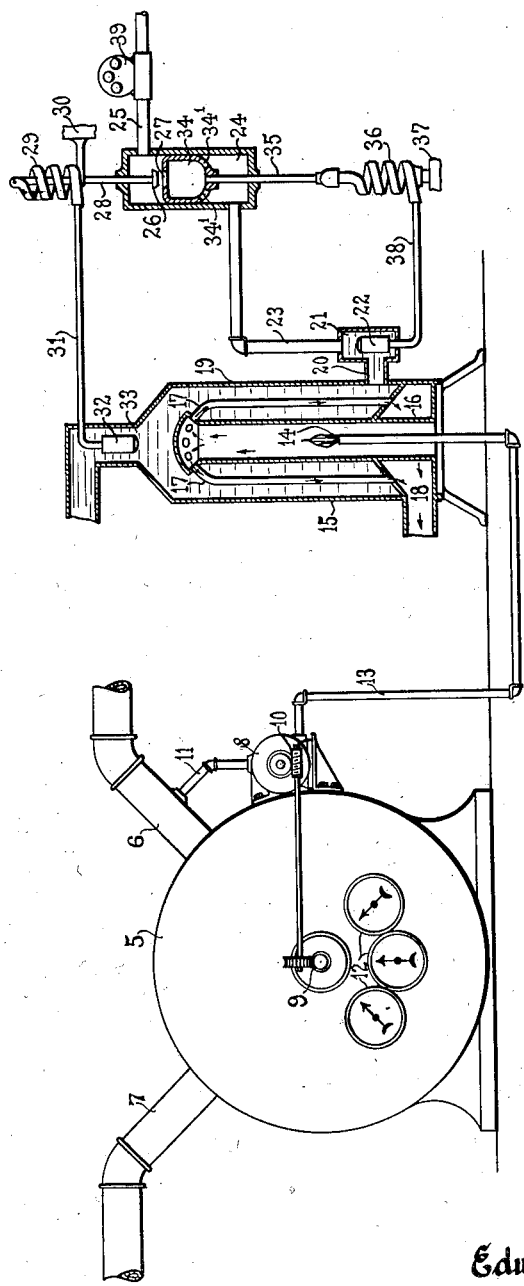

1,678,918

UNITED STATES PATENT OFFICE.

EDWIN X. SCHMIDT, OF MILWAUKEE, WISCONSIN, ASSIGNOR TO THE CUTLER-HAMMER MFG. CO., OF MILWAUKEE, WISCONSIN, A CORPORATION OF WISCONSIN.

APPARATUS FOR DETERMINING AND ALSO INDICATING THE TOTAL HEATING VALUE OF FLOWING COMBUSTIBLE FLUID.

Application filed April 30, 1926. Serial No. 105,666.

This invention relates to improvements in apparatus for determining and also indicating the total heating value of flowing combustible fluid.

An object of the invention is to provide simplified means for performance of the functions aforementioned, without sacrificing accuracy of the determinations so effected.

The invention contemplates extraction from the main flow of combustible fluid of a sample flow to be supplied to a suitable calorimeter, and another and more specific object of the invention it to provide means for positively and accurately proportioning the sample flow with respect to the main flow under insured conditions of like temperature and pressure.

Other objects and advantages of the invention will hereinafter appear.

The accompanying drawing, consisting of a single figure, illustrates one form of the apparatus, which will now be described; it being understood that various changes in the construction and arrangement of the parts may be made without departing from the spirit and scope of my invention as defined in the appended claims.

In the drawing the numeral 5 designates a positive displacement pump, said pump having an inlet pipe 6 leading from a suitable source of combustible fluid supply and an outlet pipe 7 leading to any desired point or points. Pump 5 is driven by the flowing fluid or by any suitable external means (not shown), whereas a relatively small positive displacement pump 8 is positively connected therewith to be driven thereby. Said connection, as shown, may comprise worm and pinion gearing 9 and 10, whereby pump 8 is driven at a speed which is materially less than the speed of pump 5. The inlet end of pump 8 is connected by means of pipe 11 with the inlet pipe 6 of pump 5, whereby a continuous sample of the fluid is withdrawn, which sample is positively and quantitatively proportional to the amount of fluid passing through pump 5.

If desired, the meter 5 may be provided with the usual dials 12 for indicating or registering the total volume of fluid passed through pump 5. The readings of the dials 12 may be employed to calculate the average number of heat units per unit volume of the fluid passed through pump 5. However, it is ordinarily only desired to know the total number of potential heat units in the fluid passed through pump 5, so that the total volume of the fluid is immaterial. The means now to be described provide for determination of the total number of potential heat units in the fluid passed through pump 5, and hence the dials 12 may be dispensed with.

Thus the outlet of pump 8 leads, through piping 13, to the burner 14 of a suitable calorimeter, such as indicated in general at 15. Burner 14 is located within a tubular member 16, and air for combustion of the test fluid is admitted through the lower end of said member. The products of combustion pass upwardly through member 16 and thence pass downwardly through a plurallity of radially arranged tubes leading from the otherwise closed upper end of said member. The lower ends of said tubes 17 are adapted to discharge into a suitable chamber 18 and thence to the atmosphere.

The member 16 and tubes 17 are encased within a suitable receptacle 19 for water or other liquid. Leading into receptacle 19 near the lower end of the latter is a pipe 20, said pipe having a suitable enlargement or chamber 21 to receive a thermometer bulb 22, whereas chamber 21 is in turn connected through piping 23 with the outlet end of a valve chamber 24. The inlet end of valve chamber 24 is connected with a water or other liquid supply pipe 25, whereas passage of liquid through said valve chamber is controlled and regulated by means of an automatically adjustable valve disk 26 and an automatically adjustable valve seat 27.

Valve disk 26 is connected by means of rod 28 with the free upper end of an expansible member 29, the lower end of said member being fixed to a suitable support 30, and also communicating through pipe or tube 31 with a thermometer bulb 32 located at the outlet end 33 of receptacle 19. Valve seat 27 is formed in a hollow piston-like member 34 having a plurality of unobstructed openings 34' on the lower side thereof. Member 34 is connected through rod 35 with the upper free end of an expansible member 36, the lower end of the latter being fixed to a suitable support 37, and also communicating through pipe or tube 38 with the inlet thermometer bulb 22.

Thermometers 22 and 32 and their associated elements are thus differentially related in a manner to regulate the supply of cooling water to maintain a substantially constant temperature rise of the latter in its passage through receptacle 19. Thus, assuming the test gas to have a given heating value the valve disk 26 and seat 27 will be automatically separated to the degree illustrated whereby a predetermined rate of flow of the cooling water is permitted, to maintain the temperature change of the latter substantially constant. Moreover, assuming an increase in the heating or combustion calorific value of the test gas, a corresponding increase in temperature of the cooling liquid and thermometer 32 at outlet 33 will result, thereby effecting further opening of valve 26 for supplying cooling water at an increased rate sufficient to maintain the predetermined temperature rise of the latter.

Similarly, it will be noted that a change in the basic temperature of the water, that is, prior to its passage through the calorimeter, will affect thermometers 22 and 32 to a like degree, and hence will not modify the determinations of the device as a whole.

As is well known a measure of the heat absorbed by the cooling water in its passage through the calorimeter will likewise be a measure of the number of heat units liberated by the combustion of the test gas. Hence it is only necessary to measure the quantity of cooling water required to maintain the predetermined temperature rise of the latter, and I accordingly provide a meter 39 for this purpose. Moreover, since the rate of supply of test gas to the calorimeter is positively and accurately proportioned with respect to the rate of supply through pump 5, the meter 39 may be, and preferably is, calibrated to indicate directly the number of heat units passing through said pump.

While I have shown wet displacement pumps 5 and 8 it will be understood that dry displacement pumps may be employed if desired. Also, while I have shown means for varying the rate of supply of cooling liquid to maintain a substantially constant temperature change of the latter. it will be apparent to those skilled in the art that like results may be obtained by maintaining the supply of cooling liquid constant and measuring the variations in temperature rise of the latter. In the latter case the temperature rise will indicate the rate of potential heat flow.

I am aware that it has heretofore been proposed to proportion the test sample of a combustible fluid with respect to the main flow thereof by means of an orifice plate; but such a device is subject to many uncontrollable variable factors which render the same impracticable for most purposes, especially where accurate determinations are necessary or desirable.

What I claim and desire to secure by Letters Patent is:

1. Apparatus for determining the total number of heat units in a flow of combustible fluid, which comprises a pair of positive displacement pumps or respectively proportioning the main flow of said fluid and the flow of a continuous sample thereof, and calorimetric means for determining the total number of heat units in said sample, said means being calibrated to indicate directly the total number of heat units in said main flow of fluid.

2. Apparatus for determining the total number of heat units in a flow of combustible fluid, which comprises a pair of positive displacement pumps for respectively proportioning the main flow of said fluid and the flow of a continuous sample thereof, and calorimetric means for determining the total number of heat units in said sample, the indications of said means being directly proportional to the total number of heat units in said main flow of fluid.

3. Apparatus for determining the total number of potential heat units in a given supply of combustible fluid, which comprises a positive displacement pump for supplying said fluid, a relatively small positive displacement pump driven at a speed directly proportional to the speed of said first-mentioned pump to supply a continuous sample of said fluid which is definitely proportioned with respect to the main supply thereof, and a combustion calorimeter for ascertaining the total number of heat units in said sample flow, the indicating means of said calorimeter being calibrated in accordance with the quantitative proportionality between said sample flow and said main flow to indicate the total number of heat units in the latter.

4. Apparatus for determining the total number of heat units in a flow of combustible fluid, comprising a positive displacement pump through which said fluid is adapted to flow, a relatively small positive displacement pump, the capacity of which is definitely and accurately proportioned with respect to that of the first-mentioned pump, said small pump being connected in a manner to provide for withdrawal of a continuous sample of fluid, means for burning said sample in heat exchanging relation with a flowing liquid, means for automatically varying the rate of flow of said liquid to maintain a constant temperature rise thereof as the result of the heat transfer, and a meter through which said liquid is adapted to flow.

5. Apparatus for determining the total number of heat units in a flow of combustible fluid, which comprises a pair of positive displacement pumps for respectively proportioning the main flow of said fluid and the flow of a continuous sample thereof under like conditions of temperature and pressure, and calorimetric means for determining the total number of heat units in said sample, said means being calibrated to indicate directly the total number of heat units in said main flow of fluid.

6. Apparatus for determining the total number of heat units in a flow of combustible fluid, comprising a positive displacement pump through which said fluid is adapted to flow, a relatively small positive displacement pump, the capacity of which is definitely and accurately proportioned with respect to that of the first-mentioned pump, said small pump being connected in a manner to provide for withdrawal of a continuous sample of said fluid, means for burning said sample in heat exchanging relation with a flowing liquid, means for automatically varying the rate of flow of said liquid to maintain a constant temperature rise thereof as the result of heat transfer, and a meter through which said liquid is adapted to flow, said meter being calibrated to indicate directly the total number of heat units in the fluid flowing through said first-mentioned pump.

In witness whereof, I have hereunto subscribed my name.

EDWIN X. SCHMIDT.